Patented Mar. 4, 1947

2,416,905

UNITED STATES PATENT OFFICE 2,416,905

METHOD OF HYDROGENATING COUMARONE-INDENE RESIN

William H. Carmody, deceased, late of Springfield, Ohio, by Marie O. Carmody, administratrix, Springfield, Ohio, assignor to Carmody Research Laboratories, Inc., Springfield, Ohio, a corporation of Ohio No Drawing. Application December 3, 1943, Serial No. 512,787

5 Claims. (Cl. 260—81)

This invention relates to the selective hydrogenation of indene and coumarone polymers. The application herein is a continuation-in-part of the application of William H. Carmody, Serial No. 280,128, filed June 20, 1939.

In the production of coumarone-indene resins by the polymerization of the resin-forming unsaturates coumarone and indene which occur in the crude solvent naphtha from coke oven light oil, in the coal-derived drip oils, and in the recycle oils from cyclization processes, the reresultant polymers, representing all the different orders of polymerization, possess unsaturation of two sorts. One sort of unsaturation is in the benzene rings of the monomeric units which are linked to form the polymer, and the other sort of unsaturation occurs solely in the terminal unit of each of the polymers. In indene polymers unsaturation of the latter sort is in the cyclopentadiene structure of the final monomeric unit of the polymer. It is the premise, supported by experience, that the yellowing of coumarone and indene substances occurs by reaction at the terminal double bond or point of unsaturation of each of the polymers. This phenomenon of "yellowing" is a seriously disadvantageous property of the resins composed of the polymers of indene and of coumarone, and of mixtures of those polymers. For convenience it is considered the chemical mechanism by which yellowing occurs in coumarone and indene polymers to be a fulvenation reaction in which there initially is a combination with oxygen accelerated by subjection to ultra-violet rays as in sunlight.

It has been the experience of the art that the initial purity of a coumarone-indene resin, by which is meant a resin composed of the polymers of indene or composed of the polymers of coumarone as well as a resin composed of mixtures of those polymers, takes place in spite of the greatest care which may be exercised to obtain a resin which initially is of high purity. Whereas the yellowing reaction which is termed fulvenation tends to occur during the progress of the condensation and polymerization reaction by which the polymers are formed to produce initially discolored or highly colored coumarone-indene resins, it occurs progressively in resins which by care exercised in their formation are initially of very light olor. Taking a coumarone-indene resin which has been carefully prepared for maximum purity and which is initially thus of very light yellow coloration in a mass or lump, such resin is capable of producing a film which as initially deposited from solution is apparently colorless. This initially colorless film upon exposure to light and air will, however, rapidly and progressively darken until it has acquired a reddish brown or dark brown coloration.

It is the premise that this yellowing of coumarone and indene polymers occurs by aldehyde development in the terminal unit of the coumarone and indene polymers. Each such terminal unit, like the other units of the polymeric structure, has three double bonds in the benzene ring of the unit. Unlike the other units of the polymeric structure, however, it has an initial non-nuclear double bond lying outside the benzene ring or aromatic nucleus of the structure. Thus if we assume the formula for the indene monomer to be as follows:

Formula A

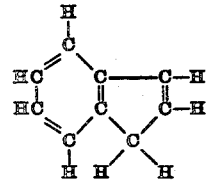

we have outside the benzene ring of the unit a point of unsaturation at which polymerization may take place. As it is conceived the mechanism of polymerization by means of a catalyst, such for example as sulphuric acid, an addition product is first formed between indene monomers and the sulphuric acid, this action taking place in each monomer at the double bond outside the aromatic nucleus of the molecule. Subsequently two such addition products unite, splitting out the sulphuric acid catalyst but leaving a residual acid radical in the terminal unit of the dimer. Since the addition product is relatively unstable, this residual acid radical splits off to regenerate the double bond in the structure which it vacates. The same mechanism will occur in the case of trimers, tetramers and higher polymers comprising any given number of monomeric units, the double bond in the structure outside the aromatic nucleus in the terminal unit of the polymer being regenerated as a final incident to the polymerization. This leaves the terminal indene unit in the following condition:

*Formula B*

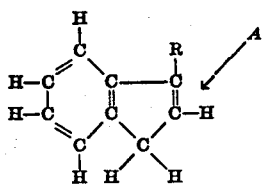

in which "R" represents the remainder of the polymeric structure comprising any given number of indene units. Similarly, the terminal unit of the coumarone polymer may be considered as having the following structure:

*Formula C*

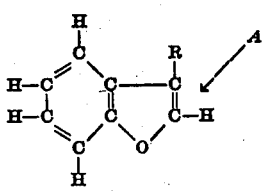

in which likewise "R" represents the remaining molecular structure of the polymer comprising any given number of coumarone units.

It may be taken as a fact that the polymerization of indene and of coumarone proceeds identically, although the tendency of the indene is to build up to polymers higher than those of the coumarone, that is to polymers comprising a greater number of monomeric units. Resins composed of a mixture of coumarone and indene polymers will, therefore, be taken herein as to mechanism of polymerization and discoloration, as also illustrative of resins formed of unmixed polymers of either coumarone or indene.

It is this double bond outside the aromatic nucleus in the terminal unit of the polymer which is susceptible to oxidation, and it is a hydrogen atom adjacent this double bond which reacts to form acids, aldehydes and ketones. Both hydrogen atoms adjacent the double bond in question (in the monomer) are easily replaced by organic radicals, complexes or residues either successively or simultaneously.

Since it will be understood that fulvenation, or discoloration, can be represented in terms of oxygen addition at this non-nuclear double bond of the terminal unit, it has been discovered that by blocking the possibility of oxygen combining with the terminal indene unit, the color development which is termed fulvenation can be precluded. Theoretically this can be accomplished in any manner which effects a saturation of the double bond which is outside of the aromatic nucleus, this double bond being designated "A" in the simplified formulae given above. Saturation at this point blocks the en.... line of reaction steps by which discoloration proceeds, and the polymer saturate at such point indefinitely will retain its initial color.

Experience has shown that hydrogenation so conducted as to saturate substantially all the polymers of a polymerized body of indene at this point in the terminal units of the polymers, while giving a resinous body protected against discoloration does not greatly increase the solubility of such body. Also as an observation confirmatory of the premise as to the point of attack in an indene polymer to produce discoloration, it has been observed that the lower indene polymers, such as the indene dimers, discolor more rapidly than do the higher indene polymers and ultimately attain a deeper coloration. Whereas, saturation with hydrogen at the point "A" in the terminal unit of the indene polymers results in producing polymers which are protected against discoloration, but the solubility of which is not substantially increased, a general attack upon the polymers by means of hydrogen has a different effect. Thus if indene polymers be indiscriminately hydrogenated with saturation of a substantial proportion of the double bonds in the aromatic nuclei of the polymers, the solubility of the polymers may be greatly increased by a quantitatively great introduction of hydrogen, but to the extent that the specified non-nuclear double bonds of the polymers have not been saturated by contact with hydrogen, the polymers retain their capacity for the "yellowing" reactions.

In the hydrogenation of coumarone-indene resin and other resins metal catalysts such as Raney nickel catalyst has been largely employed. Raney nickel is an extremely active hydrogenation catalyst for the polymers of coumarone-indene resin in all orders of polymerization, and its action renders the progress of hydrogenation extremely difficult to control when that catalyst is used. Even though it be desired to saturate with hydrogen only the non-nuclear double bond outside the benzine ring or aromatic nucleus in the terminal unit of the several polymers of the resin, the activity of the catalyst causes hydrogen in some measure promiscuously also to enter the double bonds throughout the polymers. Thus the hydrogenation of coumarone-indene polymers with Raney nickel catalyst tends to produce a resin which is of increased solubility, and also to produce a coumarone-indene resin which is of improved color stability by saturation of some of the non-nuclear double bonds outside the aromatic nuclei. In accordance with the above discussion, saturation of the double bonds in the aromatic nuclei has no effect in preventing color development in the polymers of the resin. This is true of all the coumarone-indene polymers from the dimers to those polymers containing a great number of the indene or coumarone units. In order, therefore, to obtain a coumarone-indene resin of good color stability by hydrogenation with Raney nickel catalyst it is necessary to hydrogenate under such conditions as to effect substantially complete hydrogenation of the several polymers of the resin throughout their chemical structure. Otherwise there is marked lack of color stability in the hydrogenated resins.

The present invention offers a full and satisfactory answer to the problem of producing non-yellowing or color-stable coumarone-indene resin, by a method economical in its consumption of hydrogen and moderate in its hydrogenating conditions. Recognizing that for some purposes it may be and is desired to introduce hydrogen partially or fully to saturate the double bonds in the aromatic nuclei of the resin polymers such is not within the compass of my present invention, nor does the accomplishment of that result of itself impart chemical stability and color stability to the resin.

It will readily be appreciated wherein the economy of this hydrogenation method resides in the light of the fact that the prevention of "yellowing" can be fully accomplished by hydrogen-saturating the two carbon atoms adjacent the non-nuclear double bond in the terminal unit of the resin polymers. As the size of the polymeric resin molecule increases, i. e., as the number of its monomeric units becomes greater, the percentage of hydrogen required to eliminate the non-nuclear double bond by saturation becomes proportionately less with respect to the molecular weight of the molecule. Thus with liquid coumarone-indene resins composed of coumarone and indene dimers and other low-melting coumarone-indene resins containing a relatively large proportion of dimers or other of the lower polymers, the quantity of hydrogen required for color stabilizing hydrogenation is much greater proportionately than with a resin composed wholly or chiefly of polymers formed of a relatively great number of monomeric units. Whereas the economy of this method in consumption of hydrogen is, therefore, most striking in the higher molecular weight and higher melting coumarone-indene resins, it is also economical in the case of all polymers down to and including the coumarone and indene dimers. Regardless of the polymer size the effect in color-stabilization is positive.

In conducting the method of this invention hydrogenation is performed in the presence of black copper oxide as a selective hydrogenation catalyst. Black copper oxide is not as energetic in its catalytic effect as metallic nickel and the important difference in its action is that it does not attack promiscuously all the double bonds of the resin molecule including those in the aromatic nucleus or benzene ring, but is selective in its action causing attack by hydrogen only at the above-mentioned non-nuclear terminal double bond with entry of two molecules of hydrogen into the polymeric resin molecule at that point.

This may be proved by subjecting benzene to a hydrogenation treatment with black copper oxide catalyst. There was placed 100 cc. of an approximately pure benzene fraction, consisting in substantial entirety of simple monomeric benzene ring structures, in a hydrogenation bomb with 6 grams of black copper oxide. The bomb was closed and hydrogen was run in under pressure. The maximum temperature was 100° C. and the initial pressure 1000 pounds per square inch. The final pressure was 1000 pounds per square inch, showing that no hydrogen was introduced into the benzene rings or absorbed by the catalyst. The addition of monomeric indene to benzene and similar aromatic solvent substances presenting no point of unsaturation exterior to the benzene ring resulted, under identical hydrogenating conditions, in a consumption of hydrogen very close to that theoretically required to saturate the two carbon atoms which give the single point of unsaturation in the non-nuclear structure of the indene.

Experiment has shown that the quantity of black copper oxide catalyst preferably should be about 5% to 15% the weight of the resin. Although this proportion is approximately that used in the case of Raney nickel catalyst, the black copper oxide presents a distinct advantage because of its lower cost compared with Raney nickel, because of the fact that it is less susceptible to catalyst poison, and because no special precautions are required in connection with its preparation, storage, or use. These advantages are aside from the advantage of black copper oxide catalyst in producing a definitely non-yellowing coumarone-indene resin, and in doing so with approximately a minimum consumption of hydrogen. Experiment has shown that 5 grams of black copper oxide catalyst to each 100 grams of resin is substantially the minimum quantity of catalyst with which the desired results will be secured; and although a percentage of the catalyst greater than 15% may be used, such greater percentage is under most circumstances unnecessary and performs no commensurately improved function in the hydrogenation reaction.

In exemplifying this invention by means of the several specific examples hereinafter set forth, a uniform procedure has been utilized in order that the results may be comparative in their illustration. In the procedure of all the following examples a standard hydrogenation bomb was used; the resin was ground; and the ground resin together with solvent and catalyst was placed in the bomb and the bomb then closed. Hydrogen gas was admitted to the bomb from a suitable supply, as from cylinders of compressed hydrogen at the pressure desired for each particular experiment. The whole assembly was then placed in rotating mechanism of suitable well-known kind and was warmed by gas burners. The bomb is fitted with a thermometer well carrying a thermometer in the usual manner.

During the progress of the hydrogenation the rotating mechanism was stopped at intervals to observe data as to time, pressure and temperature. When the reaction was completed as indicated by cessation in pressure drop within the bomb, the temperature was restored to its initial value and the pressure was again observed. The bomb was vented down to atmospheric pressure and its contents were removed. The catalyst was removed from the reaction solution by filtration and the solvent was removed by steam distillation. These procedures yield a molten residual resin, which is poured into a pan to harden.

Except in those instances in which some element of the reaction mixture was omitted for the purpose of checking the essential features or in which certain observations were considered unnecessary, the foregoing procedure was in every instance followed. Also in operating to obtain recordable data, the usual precautions were taken to ensure that the experiments were as quantitative as possible and each bomb, therefore, was carefully calibrated to volume and the volume of the reaction mixture deducted from it. The figure so secured represented the hydrogen gas volume in the bomb, from which calculations gave the number of cubic centimeters of hydrogen gas employed. This volume was compared with the expected or theoretical value based on the weight of the resin subjected to treatment, and the approximate average molecular weight of the polymers hydrogenated.

The invention herein may be exemplified as follows:

Example 1

100 grams of coumarone-indene resin, having a melting point of 150° C. (cube in mercury), together with 100 cc. of petroleum benzine and 10 grams of black copper oxide catalyst, was placed in a bomb having a volume of 920 cc. The volume of charge was 200 cc., thus leaving a space having a volume of 720 cc. for the hydrogen gas. The bomb was sealed and hydrogen was run in with heating of the bomb and rotation in the manner above described.

The time of treatment was 3½ hours. The maximum operating temperature was 159° C. The initial pressure was 1290 lbs. per square inch, and the final pressure was 1224 lbs. per square inch.

This run shows a pressure drop of 66 pounds over the course of the reaction. 66 pounds divided by 14.7 (1 atmosphere of pressure) equals 4.48. This multiplied by 720 gives 3220 cc. of hydrogen consumed by the 100 grams of resin. 100 grams of the resin is 0.13 mol. of resin and requires 2890 cc. of hydrogen to saturate the single non-nuclear double bond of each resin molecule, and requires 57,800 cc. of hydrogen to completely saturate the rings, or a total of 60,690 cc. to totally saturate all the points in the resin. The selectivity of the hydrogenation catalyst used is noted by comparing 3220 cc. actually used with 2890 cc. required for the one non-nuclear double bond.

The average molecular weight of this coumarone-indene resin melting close to 150° C. (cube in mercury) is approximately 775. The number of units in the resin molecules averages about 6.67. Two atoms of hydrogen are needed to saturate two non-nuclear unsaturate carbon atoms of each polymer, and there are three double bonds in the benzene ring of each unit of the polymer. Remembering that the average number of units in the polymer is 6.67 for this particular resin, it will require $3n + 1$ mol. of hydrogen wholly to saturate each resin molecule. In this instance $n$ being 6.67, a total of 21 mols. is required wholly to saturate the benzene rings or aromatic nuclei of the average resin molecule, as well as the non-nuclear terminal of the molecule. The ratio of hydrogen required to eliminate the non-nuclear double bond to that required wholly to saturate the molecule is 1 to 21, which is 4.75% of the maximum potential hydrogen consumption, and 4.7% of 60,690 cc. is about 2890 cc. In Example 1 the hydrogen consumption of 3220 cc. shows that the single terminal non-nuclear double bond of each resin molecule is saturated 5.27%, which means that there has been some slight introduction of hydrogen into the aromatic nuclei of the coumarone and indene units comprised in the polymeric resin molecules, but that such nuclear saturation is not substantial.

In order for Raney nickel to have done as well in saturating the non-nuclear double bond it would have to saturate also the benzene rings of the resin molecules, and as above explained, such saturation is unnecessary in obtaining a non-yellowing coumarone-indene resin.

The resin produced in Example 1 was a clear, colorless resin. When exposed to ultra-violet light in a "weathermeter" for 48 hours, it showed no trace of yellowing. After exposure to sunlight for a period of three months another sample of the resin showed barely perceptible discoloration.

It is to be understood that in the ratio represented by 1 to $3n + 1$, $n$ is a variable which represents the average number of units in the polymeric molecules of any coumarone-indene resin under consideration.

Inasmuch as the coumarone and indene polymers each present the several diverse points of attack by hydrogen which have been above discussed, the total proportional volume of hydrogen absorbed by any given weight of the resin is not conclusive as to the selectivity of the hydrogenation. The following example is, however, conclusive in showing the selectivity of hydrogenation in the presence of black copper oxide catalyst.

*Example 2*

63 grams of approximately pure indene and 51 grams of high-flash solvent naphtha, were placed in the bomb with 6 grams of black copper oxide catalyst. The anticipated consumption of hydrogen fully to hydrogenate the non-nuclear bonds throughout the entire body of the indene was 11,760 cc. Hydrogenation was conducted at an operating temperature close to 100° C. at an initial pressure of 1435 lbs. and at a final pressure of 1220 lbs. The observed hydrogen consumption was 11,700 cc. It will be noted that in the above both the indene and an aromatic solvent were present. Had Raney nickel catalyst been used, the result would have been a total hydrogenation of both components and the volume of hydrogen gas absorbed would have been very much greater than 11,700 cc. With black copper oxide catalyst it was to be anticipated that only the indene monomer would be acted upon and that the aromatic solvent would be unattacked, and also that only the non-nuclear double bond of the indene monomer would be hydrogenated. On this basis it was computed that 11,700 cc. proves the selective effect of the catalyst within reasonable experimental error.

It is an important advantage of black copper oxide, as a hydrogenation catalyst for coumarone-indene resin such as with the chromite hydrogenation catalysts use of which is exemplified in detail in companion application Serial No. 512,785, filed December 3, 1943, that by its use non-yellowing coumarone-indene resins can be produced by hydrogenation at temperatures far below those commonly employed in the catalytic hydrogenation of resins. Whereas it has been usual in the past to effect such reaction at temperatures of about 200° C. and much higher, black copper oxide catalyst gives good results at temperatures within the approximate range of 100° C. to 175° C., and even at temperatures as low as 70° C. or 75° C. The following example describes a hydrogenation treatment purposely conducted at low temperature to determine what temperature, if any, represents the critical minimum in producing a non-yellowing resin from coumarone-indene resin by hydrogenation.

*Example 3*

100 grams of coumarone-indene resin having a melting point of 150° C. (cube in mercury) was placed in the hydrogenation bomb with 100 cc. of the aliphatic hydrocarbon solvent "Varnolene" and 10 grams of black copper oxide catalyst. Hydrogen was run in. Because of the low temperature range employed in this exemplary hydrogenation treatment, a pressure higher than that of Example 1 was used. The initial hydrogen pressure was 1835 lbs. per square inch, and the initial temperature was 19° C. The time of treatment was about 2½ hours. The temperature was raised progressively during the treatment and apparently no substantial hydrogenation occurred until the temperature rose to about 50° C. As the temperature was increased from 50° C. to 76° C. there was an increase in pressure from 2000 lbs. per square inch to 2170 lbs. per square inch. Such apparent increase in pressure was, however, due to rising temperature, and there was in fact a substantial hydrogen absorption. When the batch was cooled to the original temperature of 19° C., the pressure dropped to 1780, showing an actual pressure loss of 55 lbs. This 55 lb. decrease in pressure corresponds to 2950 cc. of hydrogen, or a percentage of 4.86% the total volume of hydrogen the coumarone-indene resin is capable of taking. Analysis shows that the reaction was substantially complete at about 70° C. to 75° C.

The coumarone-indene resin subjected to this hydrogenation treatment was tested for its retention of the yellowing tendency and was found to have almost as good color stability as those resins which were treated at higher temperatures.

As to the factors of temperature and pressure, it is apparent from the foregoing discussion and exemplification that relatively low temperature and relatively low pressure is adequate to effect hydrogenation of coumarone-indene resin with black copper oxide catalyst in a molecular ratio of approximately 1:1. Somewhat higher temperatures may be used, desirably by hydrogenating initially at a temperature below 200° C. and raising the temperature of the reaction mixture at a point where the absorption of hydrogen tends to lag. By so doing the time required for a thorough saturation at the non-nuclear double bonds in the resin molecules may be shortened. In no case, however, do I find it desirable to utilize a maximum temperature in excess of 225° C. when using black copper oxide as a catalyst. In no case do I find it desirable to conduct the hydrogenation under a pressure substantially in excess of 2100 lbs. per square inch.

The following two examples illustrate hydrogenation with black copper oxide catalyst under what may be considered average and usual temperature and pressure conditions for this hydrogenation process.

*Example 4*

100 grams of the same coumarone-indene resin and 100 cc. of the aliphatic hydrocarbon solvent "Varnolene" were placed in the bomb with 10 grams of black copper oxide catalyst and hydrogen was run in under pressure. The operating temperature of the reaction was about 141° C. The initial pressure was 1850 lbs. and the final pressure was 1795 lbs.

The actual consumption of hydrogen was 2948 cc., which gives a ratio of 4.85% to the total volume of hydrogen which would have been absorbed had all the double bonds of all the molecules been saturated.

*Example 5*

100 grams of the same coumarone-indene resin and 100 cc. of petroleum benzine were placed in the bomb with 10 grams of black copper oxide catalyst and hydrogen was run in under pressure. The operating temperature of the reaction was close to 157° C. The initial pressure was 1010 lbs. and the final pressure was 950 lbs.

The actual consumption of hydrogen was 2940 cc., which gives a ratio of 4.84% to the total volume of hydrogen which would have been absorbed had all the double bonds of all the molecules been saturated.

In connection with hydrogenation carried out in accordance with the present invention, it has been discovered that a number of different solvents can be used satisfactorily, such as methyl-cyclohexane, ethyl-acetate, petroleum benzine, diethyl ether, and dibutyl phthalate, and that in general solvents can be satisfactorily employed which fall within any one of the following five classifications:

1. Cycloparaffins
2. Aliphatic esters
3. Straight chain paraffins
4. Ethers
5. Aromatic acid esters The following five experiments indicate results secured by the use of black copper oxide on coumarone-indene resin with some of those solvents, from which it will be understood that the solvent does not interfere with hydrogenation nor does it particularly influence it.

*Example 6*

100 grams of coumarone-indene resin having a melting point of 150° C. (cube in mercury) and 100 cc. of methyl-cyclohexane were placed in the bomb with 10 grams of black copper oxide catalyst and hydrogen was run in under pressure. The operating temperature of the reaction was close to 162° C. The initial pressure was 1015 lbs. and the final pressure was 960 lbs.

The actual consumption of hydrogen was 2950 cc., which gives a ratio of 4.86% to the total volume of hydrogen which would have been absorbed had all the double bonds of all the molecules been saturated.

*Example 7*

100 grams of the same coumarone-indene resin and 100 cc. of petroleum benzine were placed in the bomb with 10 grams of black copper oxide catalyst and hydrogen was run in under pressure. The operating temperature of the reaction was close to 156° C. The initial pressure was 1025 lbs. and the final pressure was 950 lbs.

The actual consumption of hydrogen was 2940 cc., which gives a ratio of 4.84% to the total volume of hydrogen which would have been absorbed had all the double bonds of all the molecules been saturated.

*Example 8*

100 grams of the same coumarone-indene resin and 100 cc. of diethyl ether were placed in the bomb with 10 grams of black copper oxide catalyst and hydrogen was run in under pressure. The initial pressure was 1000 lbs. and the final pressure was 925 lbs.

The actual consumption of hydrogen was 3680 cc., which gives a ratio of 5.9% to the total volume of hydrogen which would have been absorbed had all the double bonds of all the molecules been saturated.

*Example 9*

100 grams of the same coumarone-indene resin and 100 cc. of dibutyl phthalate were placed in the bomb with 10 grams of black copper oxide catalyst and hydrogen was run in under pressure. The operating temperature of the reaction was close to 156° C. The initial pressure was 1000 lbs. and the final pressure was 935 lbs.

The actual consumption of hydrogen was 3180 cc., which gives a ratio of 5.2% to the total volume of hydrogen which would have been absorbed had all the double bonds of all the molecules been saturated.

*Example 10*

In order to check the molecular effect of the hydrogenation method, a liquid oily coumarone-indene resin was taken melting below 0° C. and composed chiefly of the dimers of coumarone and indene. 100 grams of this low-melting coumarone-indene resin was placed in the bomb with 10 grams of black copper oxide catalyst, without solvent, and hydrogen was run in under pressure. The operating temperature was close to 225° C. The initial pressure was 1100 lbs. and the final pressure was 910 lbs.

The actual consumption of hydrogen was 11,500 cc. With the liquid resin treated the ratio of hydrogen required to saturate the lone terminal double bond of each molecule is approximately 14% of that required fully to hydrogenate the molecule and the consumption of 11,500 cc. of hydrogen represents 118% of that required to eliminate the non-nuclear double bonds, or 14.8% of the total hydrogen consumption required wholly to saturate the molecules of the resin.

In the case of this liquid coumarone-indene resin, consisting approximately 100% of coumarone-indene dimers, the average number of units in the molecules is two, so that the formula 1:3n+1 gives a ratio of 1:7, or approximately 14%, in comparing saturation of the terminal non-nuclear structure with saturation of the entire molecular structure.

It is to be understood of all the foregoing examples that the treated resin was substantially colorless. When exposed to ultra-violet light in a "weathermeter" for 48 hours it showed no trace of "yellowing." After exposure to sunlight for a period of three months other samples of the resins were just perceptibly "yellowed."

Remembering always that the purpose of this invention is to saturate only the one specific double bond of the resin polymers in as high an order of completeness as may be possible, it will be seen that this has been effected in simple manner and by moderate operating conditions. Thus with the relatively high melting coumarone-indene resin chiefly exemplified above, the average structure of the resin polymers as to monomeric units included in them is such that a quantity of hydrogen fairly close to 5% of that required for theoretically complete saturation of all the units of all the molecules is required for my purpose. The absorption of a substantially greater proportion of hydrogen would indicate absorption into the double bonds comprised in the benzene rings of the several monomeric units of the molecules, and values below about 3% of the theoretically complete saturation would indicate that a large proportion of the resin molecules remain unsaturated as to the one non-nuclear double bond of each. The results of all the examples are to be considered as satisfactory in effecting approximately complete saturation at the non-nuclear double bonds of the polymers without substantially saturating at the double bonds in the aromatic nuclei or benzene rings of the polymers.

The above discussion and examples deal with and exemplify the use of hydrogenation in the presence of black copper oxide as the sole catalyst used, and demonstrate the satisfactory effect of hydrogenation in the presence of that catalyst. It is to be understood, however, that the hydrogenation may be conducted in the simultaneous presence of black copper oxide and one of the chromite catalysts, the use of which is disclosed and exemplified in companion application Serial No. 512,785, filed December 3, 1943. That is, the black copper oxide may be used in varied proportions with one or more of copper chromite, iron chromite and nickel chromite. When so used the diversity in the combined catalyst appears to give a catalyst-promoting effect, so that a given quantity of the combined catalyst is somewhat more effective than the same quantity of either catalyst alone. That is, the mixture or simultaneous use of black copper oxide and one or more catalysts from the group consisting of copper chromite, iron chromite and nickel chromite appears to indicate that in the presence of the other both the black copper oxide and the chromite catalyst are slightly more effective than either when used by itself. Insofar as quantity of such mixture, either made in advance or in the bomb, is concerned, it is desirable to follow the catalyst proportions given above for black copper oxide when used alone. That is, it is desirable to use a weight of combined catalyst equal to from 5% to 15% the weight of the coumarone-indene resin which is subject to hydrogenation.

It is to be understood that in the foregoing where melting point is given without qualification, it is to be taken as determined by the cube in mercury method of melting point determination. As explained, the term "coumarone-indene resins" is to be taken as inclusive of resins composed of the polymers of either of those two substances, as well as resins composed of a mixture of polymers of the two. Where pressure is given in pounds without other explanation, it is to be taken as meaning pounds per square inch. Where parts or proportions are given without express or implied qualification as to comparison of volumes, it is to be taken that parts by weight is intended. Where a monomeric substance, or resin, is named as "indene" in discussion or illustration above, "coumarone" is to be understood as alternatively applicable, the two being interchangeable in the terms of the specification.

What is claimed is:

1. A method of selectively hydrogenating coumarone-indene resin which comprises the steps of bringing such coumarone-indene resin into contact with hydrogen in the presence of black copper oxide at a temperature ranging from about 75° C. to 225° C. and under a pressure not exceeding 2100 pounds per square inch, thereby to chemically saturate only the non-aromatic double bond which characterizes the indene and coumarone resin structure.

2. A method of selectively hydrogenating coumarone-indene resin which comprises the steps of bringing such coumarone-indene resin into contact with hydrogen in the presence of black copper oxide at a temperature ranging from about 75° C. to 225° C. and under a pressure not exceeding 2100 pounds per square inch, thereby to chemically saturate only the non-aromatic double bond which characterizes the indene and coumarone resin structure, the conditions being controlled to limit the combination of resin and hydrogen to a molecular ratio of 1:1.

3. A method of selectively hydrogenating coumarone-indene resin which comprises the steps of bringing such coumarone-indene resin into contact with hydrogen in the presence of black copper oxide under such temperature and pressure conditions as chemically to saturate only the non-aromatic double bond which characterizes the indene and coumarone resin structure, the selective hydrogenation being carried out at a temperature ranging from about 75° C. to 225° C. and at an initial pressure ranging from about 1000 pounds per square inch to 1850 pounds per square inch.

4. A method of selectively hydrogenating coumarone-indene resin which comprises the steps of bringing such coumarone-indene resin into contact with hydrogen in the presence of black copper oxide under such temperature and pressure conditions as chemically to saturate only the non-aromatic double bond which characterizes the indene and coumarone resin structure, the selective hydrogenation carried out at a temperature ranging from about 75° C. to 225° C. being effected step-wise by controlling the temperature in such manner that it does not exceed 200° C. in the first stage thereof with the balance of the selective hydrogenation being carried out at the temperature of approximately 225° C. and at a pressure not exceeding 2100 pounds per square inch.

5. A method of selectively hydrogenating coumarone-indene resin which comprises the steps of bringing such coumarone-indene resin into contact with hydrogen in the presence of black copper oxide at a temperature ranging from about 75° C. to 225° C. and under a pressure not exceeding 2100 pounds per square inch, thereby to chemically saturate only the non-aromatic double bond which characterizes the indene and coumarone resin structure, the said coumarone-indene resin being in dissolved form and the catalyst constituting about 5% to 15% by weight of the said resin.

MARIE O. CARMODY,
*Administratrix of the Estate of William H. Carmody, Deceased.*

REFERENCES CITED

The following references are of record in the file of this patent:

UNITED STATES PATENTS

| Number | Name | Date |
|---|---|---|
| 2,128,984 | Carmody | Sept. 6, 1938 |
| 2,128,985 | Carmody | Sept. 6, 1938 |
| 2,139,722 | Carmody | Dec. 13, 1938 |
| 2,266,675 | Carmody | Dec. 16, 1941 |

FOREIGN PATENTS

| Number | Country | Date |
|---|---|---|
| 504,215 | German | Mar. 30, 1926 |

OTHER REFERENCES

Adkins et al.; J. Amer. Chem. Soc., vol. 53, pages 1091 to 1095 (1931). (Copy in Scie. Libr.)

Ellis; Hydrogenation of Organic Substances, 3d ed., Van Nostrand, 1930, page 158. (Copy in Division 6.)

Durland et al.; J. Amer. Chem. Soc., vol. 60, pages 1501–5 (1938), as abstracted in Chem. Abstracts, vol. 32, 1938, page 5824. (Copy in Division 6.)

Tuda et al.; Berichte 72B, pages 716–23 (1938), as abstracted in Chem. Abstracts, vol. 33, page 4979 (1939). (Copy in Division 6.)